Jan. 30, 1968  J. W. BULLS ET AL  3,366,553
PROCESS FOR CONCENTRATING AQUEOUS IODINE CONTAINING SOLUTIONS
BY DISTILLATION WITH AN IODINE-SOLVENT-H$_2$O-ENTRAINING
LIQUID
Filed Oct. 2, 1964   2 Sheets-Sheet 1

INVENTORS
JAMES W. BULLS
PERRY P. DAWSON, JR.
BY
McCarthy, Depaoli & O'Brien
ATTORNEYS

United States Patent Office 3,366,553
Patented Jan. 30, 1968

3,366,553
PROCESS FOR CONCENTRATING AQUEOUS IODINE CONTAINING SOLUTIONS BY DISTILLATION WITH AN IODINE-SOLVENT-H₂O-ENTRAINING LIQUID
James W. Bulls, Lake Jackson, and Perry P. Dawson, Jr., Austin, Tex., assignors to El Paso Products Company, Odessa, Tex., a corporation of Texas
Filed Oct. 2, 1964, Ser. No. 401,104
16 Claims. (Cl. 203—12)

ABSTRACT OF THE DISCLOSURE

A water immiscible organic liquid which is a preferential solvent for iodine and forms an azeotrope with water, such as p-xylene, is introduced into a rectification tower wherein a dilute aqueous solution of hydrogen iodide and iodine is being subjected to distillation, whereby the iodine entrained in the preferential solvent and substantially pure water are carried overhead, the water removed from the system, and the preferential solvent containing iodine returned to the tower, resulting in a bottoms product of hydrogen iodide, iodine and water in concentrated form.

The present invention relates to an improved process and apparatus for concentrating iodine-containing solutions. It has particular application to concentrating dilute solutions of hydrogen iodide and iodine in water in such a way as to permit the efficient use or recovery of iodine and its compounds.

Many chemical processes that are widely used commercially involve the use of iodine and/or iodine-containing materials as starting material, as intermediates, or as catalysts. The efficient operation of such processes is often dependent upon the efficient recovery of iodine or its compounds. They also may depend on the efficient and economic recovery or utilization of by-product materials which contain iodine. The cost of iodine is such that, if recovery is not possible, many process employing iodine and iodine compounds as catalysts are not economically practical. Hence, it is important to be able to recover iodine and various iodine-containing materials from aqueous solutions, waste, and the like, at minimum expense.

It has been suggested, in the prior art, that hydrocarbons may be employed to take up iodine or iodine-containing materials, e.g., by dehydrogenation wherein the iodine replaces the normal hydrogen. Thereafter, the iodine may be recovered from the resulting product in various ways. Typical of such a process is one described in the U.S. patent to Mullineaux et al., 2,890,253. Even in such processes as these, however, after the essential dehydrogenation is completed, large quantities of dilute solutions of iodine and hydrogen iodide in water remain to be discarded and substantial losses of the valuable iodine materials will occur if they are not recovered. Moreover, they can not readily be discarded under most circumstances because of stream pollution and other dangers. For economical recovery these solutions must be concentrated so that the hydrogen iodide and the iodine, or either of these materials, can be reused repeatedly in the basic process.

Moderately dilute solutions, in general, may be concentrated as a rule by simply performing distillation operations. These are most economically performed and require the most simple apparatus when they can be done at atmospheric pressure. However, distilling a dilute solution of water containing hydrogen iodide and iodine, the most volatile components, in most cases, are water and iodine. This is true over a rather wide range of concentrations, wherever the water content of the feed is greater than that of the azeotropic composition of aqueous hydrogen iodide. Azeotropic compositions of this type contain about 43% of water, by weight. When it is attempted commercially to concentrate dilute mixtures containing iodine by simple distillation at atmospheric pressure numerous difficulties are encountered. Iodine solidifies at a temperature of about 114° C. This is considerably above the condensation temperature of the major overhead product which is water vapor. Hence, such a distillation will result rapidly in plugging the equipment by solidification or crystallization of the iodine.

One solution to this problem, which has been suggested in the prior art, is that the distillation be conducted at an elevated pressure so that the condensation temperature of the water vapor can be maintained above the temperature at which iodine solidifies until the iodine is removed from the system. This process has obvious drawbacks. The iodine thus distilled is lost or is not reusable unless an additional recovery or separation process step is effected to separate the iodine from the major overhead product, i.e., the water vapor. This is true whether the water and iodine are separate in phase or whether the iodine is dissolved in the aqueous phase. Furthermore, the higher temperature required for distillation processes of this type, at elevated pressure, eliminates consideration of certain materials of construction which otherwise might be used economically. Aqueous solutions containing hydrogen iodide, as well as iodine, are very corrosive in any case. Moreover, the higher pressure which is required to raise the boiling point of the water excludes certain desirable materials which resist corrosion, such as glass. Therefore it is highly advantageous to be able to maintain and operate a process at atmospheric pressure, or near such pressure.

It has also been suggested in the prior art, as in Baumgartner et al., U.S. Patent 2,833,700, that additional iodide ion may be externally supplied so as to keep a high concentration of this ion in the system. Thus, when hydrogen iodide is added to maintain a proportion of at least 15%, the process may be operated in such a way as to prevent the solid elemental iodine from reaching the top of the distillation column and condenser where it otherwise would solidify and plug the equipment. Such a process has certain advantages with respect to some of the problems mentioned above, but it also possesses serious disadvantages. One of these is the need for a continuous source of high quality hydrogen iodide which is essentially free of iodine. Such a source is not always available and may be too expensive under some situations. A further disadvantage lies in the fact that the process is basically inefficient. The prime purpose of the evaporator, or the distillation column, is to effect a separation between water and hydrogen iodide. When hydrogen iodide from an extraneous source is added, over and above what is already present, the effort to separate it from the water is made that much more difficult.

According to the present invention, the problem may be solved without requiring a continuous outside source of iodine-free hydrogen iodide. It is not necessary, according to the present process, to add such material at all. Moreover, the process of the present invention is quite independent of the constitution of the mixture being concentrated, whereas in the case just described, a certain high concentration must be maintained in certain parts of the system. Hence, the present invention has the obvious advantage that it does not make the required separation of water and hydrogen iodide more difficult or less efficient by adding one of those agents.

The present invention which is designed particularly for concentrating a dilute solution which comprises hydrogen iodide, iodine and water, is applicable to systems wherein the weight ratio of hydrogen iodide to water is less than 1.3. This is the case with most such solutions. The invention includes the improvement of removing essentially pure water from the solution by distillation, after adding to the system an organic liquid agent, which is not miscible with water, which remains in the system, and which is a solvent for iodine. A wide variety of organic liquids may be used for the latter purpose.

According to a preferred method of operating the present invention, a dilute solution of hydrogen iodide and iodine in water is concentrated in such a way that almost no iodine or hydrogen iodide but only water, is removed from the solution. Of course, iodine may be recovered from the organic liquid if desired. The result of removing only water, essentially, from the system is accomplished by adding to the system a water-immiscible organic liquid, which is a preferential solvent for iodine. This organic liquid also may be called an iodine-entraining agent. Hereinafter, reference to solvent is intended to mean the organic selective solvent for iodine.

In a preferred method of operating the present invention, a finite amount of iodine-entraining agent, or selective solvent, is preferably maintained in liquid form on several plates or elements of the distillation apparatus. In the preferred case of a continuous operation, a film of the solvent is maintained continuously on each plate or surface element above the point at which the hydrogen iodide-iodine-water feed enters the rectification zone. By wetting each element or plate of the distillation apparatus with the selective solvent for iodine, all the water is intimately contacted by the solvent. This makes possible the important accomplishment of the present invention, i.e., that substantially pure water may be recovered as the overhead product. As the bottoms product from distillation, a solution of hydrogen iodide, water and iodine is obtained which is substantially more concentrated than the initial feed stock. The process is considerably more efficient in terms of energy, time and operating cost than processes which have been known and used heretofore.

Since the present process is concerned primarily with concentrating, the selective solvent for iodine or the iodine-entraining agent is preferably a liquid which will efficiently separate from water while maintaining all or substantially all the iodine in solution. This organic agent distills as an overhead product carrying the iodine with it. Many types of organic liquids which are water-immiscible may be employed for this purpose.

A variety of hydrocarbon liquids, of which the aromatic liquids are preferred but the non-aromatics are also useful, may be employed as selective solvents. Certain hydrocarbon derivatives, such as carbon disulfide and nitrobenzene, also may be used. A number of halogenated hydrocarbons are suitable, such as carbon-tetrachloride; tetrachloroethylene, ethylene dibromide, sym-tetrachloroethane and bromoform.

For most purposes, the aromatic or alkylated-aromatic hydrocarbons which have a normal boiling point reasonably near that of water are considered most satisfactory. Materials such as benzene, toluene, and the various xylenes, mixtures thereof or single xylenes are all very useful; paraxylene is particularly suitable. In general, any of these materials which form an azeotropic composition with water, boiling between about 42° and 100° C., are quite satisfactory. The composition of such azeotropes may vary very widely from 46.4 pounds of carbon disulfide per pound of water to as little as 0.15 pound of nitrobenzene per pound of water. The solubility of iodine in the solvent is of some importance, although, here again the range can be varied widely. For example, carbon tetrachloride, which has low solvency, or isooctane, which has even lower, may still be useful. The latter has a solubility for iodine of only 0.013 pound per pound of solvent at 25° C.

These various organic solvents, which are all essentially immiscible of water, will nevertheless distill as fixed "compositions" depending on the relative vapor pressures of the water and the immiscible material at the particular temperature of distillation. The weight of the immiscible solvent, which is distilled overhead per unit of water, may be readily calculated from vapor pressure and molecular weight data. The solubility of iodine in many solvents is available in technical literature or can readily be determined by simple laboratory procedures.

Liquid compositions having a weight ratio of hydrogen iodide to water of about 1.3 will distill unchanged as maximum-boiling azeotrope mixtures at about 127° C. Hence it is not readily feasible to carry out distillations of materials more concentrated than this at atmospheric pressure. It is known that azeotropic mixtures containing iodine can be distilled to produce azeotropes as overhead products and to produce a bottoms product more concentrated in iodine or even to recover pure iodine if desired. This process which is suggested in the Baumgartner patent, mentioned above, however, is outside the scope of the present invention. The separation of water from so concentrated a mixture is not the primary purpose of the present undertaking.

In selecting the solvent to be used several properties should be considered. For economic operation, the factors to be considered include cost, volatility, molecular weight, solubility for iodine and latent heat of vaporization of the solvent. Since the primary object of the invention is the net removal of water from the system, most of these properties are best related to a unit mass of water. A series of experiments were conducted to determine these properties. They have been tabulated below in Table 1. This table lists several of the properties which are considered most fundamental.

TABLE I

| Solvent | Normal Boiling Point (solvent), °C. | Water Azeotrope Boiling Point, °C. | "a" Azeotrope Composition, Lb. Solvent/ Lb. Water | "s" Solubility at 25° C., Lb. $I_2$/ Lb. Solvent | "r" Lb. $I_0$ (max.)/ Lb. $W_0$ | "$f_{max}$" Feed Composition, Lb. $I_f$ (max.)/ Lb. HI | Est. Latent Heat Load, B.t.u./lb. water removed |
|---|---|---|---|---|---|---|---|
| Carbon disulfide | 46.3 | 42.6 | 46.4 | 0.197 | 9.15 | 43.0 | 8,220 |
| Carbon tetrachloride | 76.8 | 67.2 | 22.8 | 0.019 | 0.43 | 2.02 | 2,950 |
| Benzene | 80.1 | 69.4 | 10.1 | 0.164 | 1.66 | 7.80 | 2,780 |
| Cyclohexane | 81.4 | 69.6 | 10.7 | 0.028 | 0.30 | 1.41 | 2,680 |
| n-Heptane | 98.4 | 79.3 | 6.67 | 0.017 | 0.11 | 0.52 | 1,930 |
| i-Octane | 99.3 | 80.0 | 7.28 | 0.013 | 0.10 | 0.47 | 1,875 |
| Toluene | 110.6 | 84.3 | 4.00 | 0.183 | 0.73 | 3.47 | 1,630 |
| Tetrachloroethylene | 121.0 | 88.3 | 5.05 | 0.037 | 0.19 | 0.90 | 1,463 |
| Ethylene dibromide | 131.6 | 91.4 | 3.70 | 0.115 | 0.43 | 2.02 | 1,305 |
| p-Xylene | 138.8 | 92.4 | 1.90 | 0.198 | 0.38 | 1.79 | 1,274 |
| sym-Tetrachlorethane | 146.3 | 94.0 | 2.27 | 0.039 | 0.09 | 0.42 | 1,217 |
| Bromoform | 149.5 | 94.6 | 3.06 | 0.066 | 0.20 | 0.94 | 1,141 |
| Mesitylene | 164.7 | 96.4 | 0.91 | 0.253 | 0.23 | 1.08 | 1,112 |
| Nitrobenzene | 210.9 | 99.2 | 0.15 | 0.055 | 0.008 | 0.038 | 993 |

While the invention has been described in general terms, it will be more fully understood by referring to specific embodiments of apparatus and equipment. This description will be carried forward by reference to the accompanying drawings, wherein.

Figure 1:
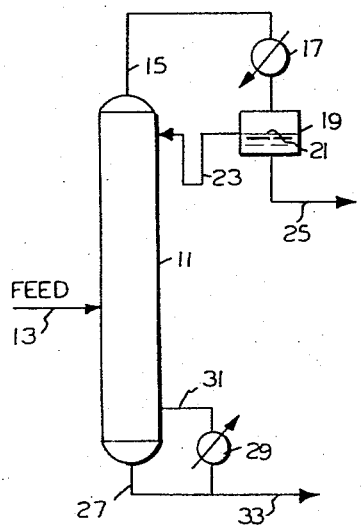
FIGURE 1 shows as simple apparatus for carrying out the principles of the invention.

Referring first to FIGURE 1, there is shown a distillation column or tower 11 with means for introducing the feed located generally in the middle part of the tower as indicated at 13. The overhead distillation products pass out through line 15 to a condenser 17 from which the condensate passes into a receiver-settler 19. Depending on the particular solvent employed and whether it is heavier or lighter than water, the arrangement of the settler 19 may be varied somewhat. As shown in FIGURE 1, it is arranged for the use of a solvent liquid which is of lower density than water. In this case, the solvent and water separate by gravity to form an interface 21, the solvent rising to the top. The solvent which contains iodine is recycled, at least in part, back to the apparatus through line 23. The water, which is essentially pure, or it may contain very small traces of iodine, may be withdrawn from the bottom of the settler 19 and discarded through line 25.

With the recycling of the organic liquids through line 23, the plates above the in-feed-point 13 tend to be contacted at all times with the organic liquid which selectively extracts the iodine from the solution. The bottoms consist of a concentrated aqueous solution of hydrogen iodide, the iodine being substantially all removed by the selective solvent. These bottoms may be taken off through line 27, a portion being returned through heat exchanger 29 and line 31 for recycle. The concentrated product is removed from the system through line 33.

Figure 2:
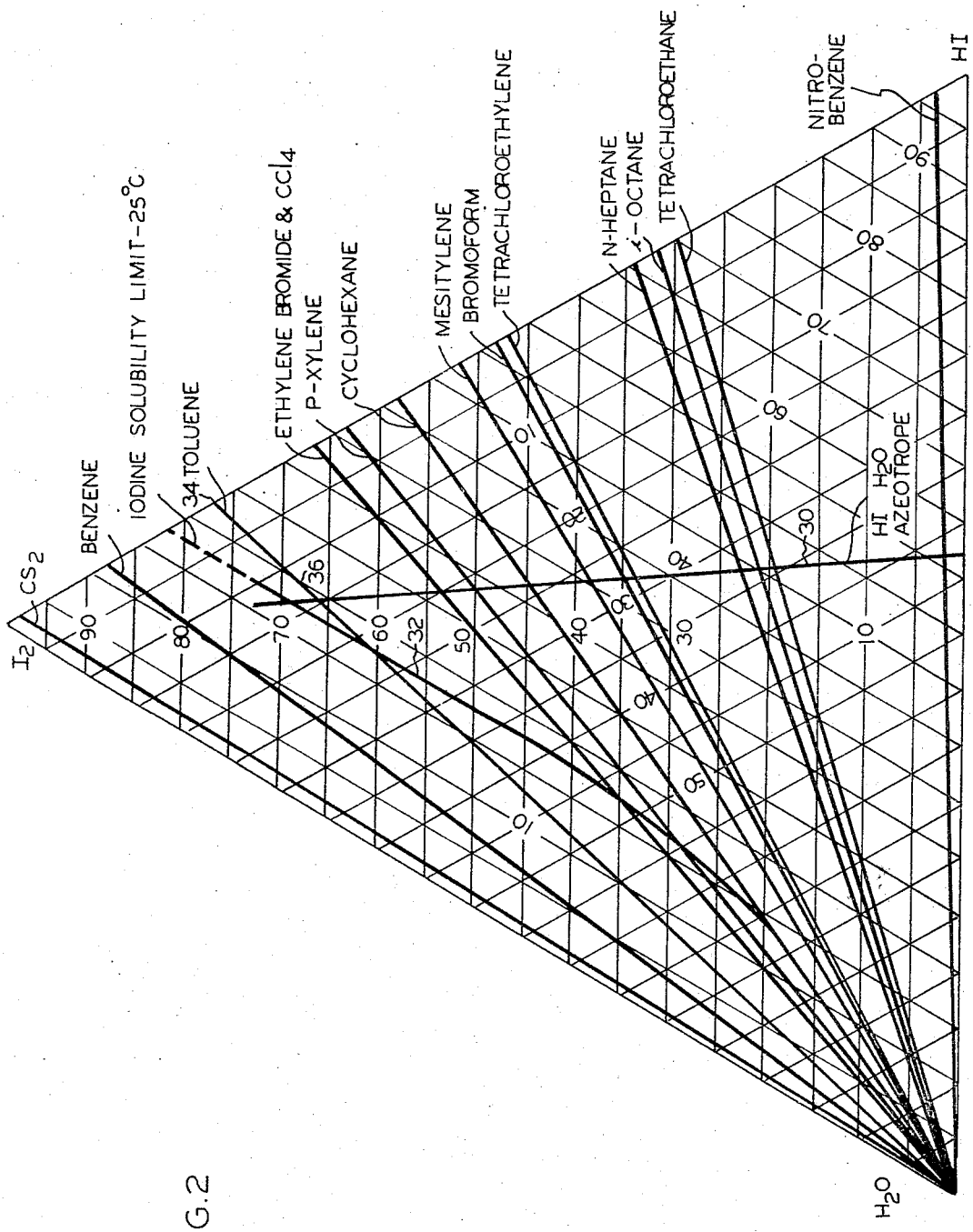
FIGURE 2 is a three component diagram illustrating certain aspects of the invention.

Referring now to FIGURE 2, there is shown a triangular graph for the purpose of representing some of the applicable characteristics of the ternary system $HI-I_2-H_2O$. Each apex of the equilateral triangle represents 100 weight percent of one of the components. The sum of the perpendiculars from the three sides to any point in the triangle must always be equal to 100 weight percent, thereby identifying any composition of a mixture of the ternary system. In FIGURE 2, line 30, which is drawn from the base point 57% HI–0% $I_2$–43% $H_2O$, extends towards the apex which would denote 100% iodine. This line represents compositions of the $HI-H_2O$ azeotrope containing iodine. The heavy curving line 32 from the 100%-water apex, which intersects the azeotrope-iodine line at a composition of about 17% HI–69% $I_2$–14% $H_2O$, represents the solubility limit of iodine in various concentrations of hydrogen iodide and water at a temperature of 25° C. Thus at 25° C., those compositions which lie under and between these two lines and above the base line of the $HI-H_2O$ system represent the preferred compositions with which this invention is concerned.

It is possible that compositions containing somewhat more iodine than represented by the above solubility limit curve also may be maintained at a single phase at higher temperatures. To the extent that they can be so maintained in single phase, such feed compositions also may be used within the scope of the present invention. The only critical limitations are that (1) the iodine-entraining agent must be immiscible with water so that the agent and water will form two phases at a decanter temperature, and (2) the initial feed must contain a weight ratio of hydrogen iodide to water of less than about 1.3. This is the significance of line 30.

In order to properly evaluate the efficiency of a particular solvent, some knowledge of the iodine content of the overhead stream is required. It has been found that a relatively simple relationship expresses the ratio of iodine to water in the overhead product as a function of the ratio of iodine to hydrogen iodide in the liquid feed. This ratio is approximately:

$$\frac{I_o}{W_o}=0.21\frac{I_f}{HI}$$

where $I_o/W_o$ is the weight ratio of iodine to water in the vapor distilled from a liquid whose composition is characterized by the weight ratio of iodine to hydrogen iodide ($I_f/HI$).

As an example of solvent selection the procedure now to be described has been found useful. In the discussion below the following symbols have the meanings indicated. Obviously $W_f = W_o + W_p$ where $W_f$ is the weight of the water in the feed, and $W_o$ and $W_p$, respectively, are the weight of the water taken from the decanter, FIGURE 1, or separator 19, and the weight of the product taken out at the bottom through line 33. The following definitions are given:

$$f=\frac{I_f}{HI}, \text{ as } \frac{\text{lb. } I_2}{\text{lb. } HI} \text{ in feed}$$

$$s=\frac{I_o(\max)}{S}, \text{ solubility as } \frac{\text{lb. } I_2}{\text{lb. solvent}}$$

$$r=\frac{I_o(\max)}{W_o}, \text{ maximum tolerable ratio}$$

$$t=\frac{I_o(\text{actual})}{W_o}=0.21f$$

$$a=\frac{S}{W_o} \text{ (azeotrope) as } \frac{\text{lb. solvent}}{\text{lb. water}}$$

$$t=r=a \cdot s=\frac{I_o(\max)}{W_o}=0.21f \text{ (max)}$$

In the case of toluene, solubility $s$ of iodine therein is 182.5 grams of iodine per 1000 grams of solvent. (Reference: Kirk & Othmer, Encyclopedia of Chemical Technolgly, vol. 7, page 947, 1951.) Converting to the units given above $s$ equals 0.1825 g. $I_2/g$ toluene.

An azeotropic composition of toluene and water distills at 85° C. at 760 mm. Hg pressure, with a composition of 20.2 percent water and 79.8 weight percent toluene. Hence, $a$ equals 0.798/0.202, equals 3.95. See Handbook of Chemistry and Physics, 44th edition, page 2175, System 588. According to the handbook, 0.05 weight percent of the aqueous layer will consist of toluene and the toluene layer will contain 0.06 weight percent of water.

Alternatively, vapor pressure data for toluene and water may be plotted. At 84.5° C. the pressure of toluene is 335 mm. Hg and that of water 425 mm. Hg. The molar ratio equals 335/425 equals 0.789. Hence, $a$ equals the number of pounds of toluene divided by the pounds of water=

$$\frac{0.789\times92}{18}=4.03$$

With the above data, the maximum ratio of iodine to water overhead for this particular solvent can now be calculated. This ratio $$r \text{ equals } \frac{I_o}{W_o} (\max)$$

and so on, as follows:

$$r=\frac{I_{o(\max)}}{W_o}=a\times s=4.0\times 0.1825=\frac{0.73 \text{ lb. } I_2}{\text{lb. } H_2O}$$

The maximum iodine content of the feed also can be calculated $$\text{since } f_{(\max)}=\frac{(I_2)}{(HI)_{(\max)}}=\frac{r}{0.21}=\frac{0.73}{0.21}=3.47\frac{\text{lb. } I_2}{\text{lb. } HI}$$

Converting this to $$\frac{\text{Percent } I_2}{I_2 + HI} = \frac{3.47 \times 100}{3.47 + 1.00} = 77.6\%$$

This point 34 is plotted on the $I_2$–HI binary line of FIGURE 2 and a line 36 is connected to the $H_2O$ apex. Any feed composition below this line 34, up to the HI–$H_2O$ azeotrope 30 should be capable of operation with toluene.

Similar calculations are made on other solvents and the data of Table I are established and plotted on FIGURE 2.

It should be noted that immiscible solvents either more or less dense than water can sucessfully be used. If solvents more dense than water are used, it is necessary only to make modifications to piping of the decanter to permit water removal and return of the solvent to the column.

The following examples will illustrate the batch process and the continuous process, respectively. In these examples, a solvent with a density of less than that of water is assumed. In the case of the solvent with density greater than that of water, it is necessary only to reverse the outlet piping of the decanter or separator 19, FIGURE 1.

Example 1

A 600 ml., round-bottom flask, heated by means of a Glas-Col electric mantle, was connected to a 12-ball, jacketed Snyder distilling column. The take-off or overhead end of the distilling column was led into a pipe above which was connected a water-cooled condenser and below which was connected a small receiver tube with take-off valve leading to a vented interface level control. To the 600-ml. flask were added 2.6 g. of alundum boiling chips and 226 g. of liquid charge containing 18.2 wt. percent of hydrogen iodide, 12.8 wt. percent of iodine, and 69.0 wt. percent of water. To the receiver and interface level control device was added a total of 29.2 g. of water. To the receiver, above the water phase, was added 13 ml. (11.2 g.) of p-xylene. About 4 to 5 ml. of p-xylene was allowed to overflow the decanter, wetting the top 3 or 4 plates in the still. Distillation was started on total reflux and it was soon apparent that the refluxing p-xylene was holding iodine in the column with water being taken overhead. The water phase was removed continuously as condensed, by holding the overhead receiver interface constant and refluxing the p-xylene phase. Small amounts of iodine were noted in the hydrocarbon phase being refluxed, characterized by the varying shade of red color developed in the condensed xylene. It is significant that the water phase remained colorless, however. By comparison of color intensity with known samples, it is estimated that the iodine concentration in the condensed xylene phase varied between 0.1% and 2% by weight. This variation was effected primarily by the xylene inventory in the column. By increasing column inventory, the iodine concentration in the condensed phase was decreased. Four sequential samples of the aqueous phase were obtained. All were clear and the last sample removed showed essentially no iodine by a starch test.

A total of 142.4 g. of aqueous phase was recovered along with 9.8 g. of xylene phase. The net weight remaining in the round-bottom flask was 104.4 g., with 9.8 g. unaccounted for, most of which was held up in the column. The following summarizes the results:

ORIGINAL CHARGE

|   | Wt. Percent | Wt. (g.) | Wt. as (g. of $I_2$) |
|---|---|---|---|
| $I_2$ | 12.8 | 29.0 | 29.0 |
| HI | 18.2 | 41.1 | 40.9 |
| $H_2O$ | 69.0 | 155.9 |  |
|  | 100.0 | 226.0 | 69.9 |

BOTTOMS PRODUCT

|   | Wt. Percent | Wt. (g.) | Wt. as (g. of $I_2$) |
|---|---|---|---|
| $I_2$ | 25.1 | 26.2 | 26.2 |
| HI | 42.2 | 44.1 | 43.8 |
| $H_2O$ | 32.7 | 34.1 |  |
|  | 100.0 | 104.4 | 70.0 |

Note that the composition of the bottoms product was approximately that of the HI–$H_2O$ azeotrope (57.8% HI) on an iodine-free basis.

Example 2

Figure 3:
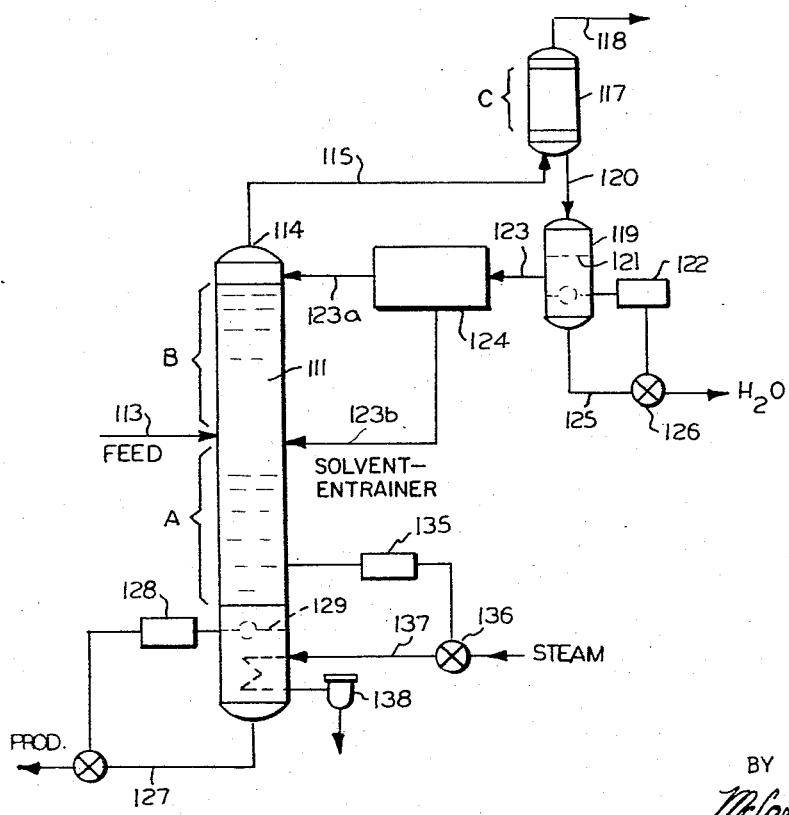
FIGURE 3 is a diagrammatic showing of a more complete apparatus, according to the present invention.

A distillation unit, similar to that of FIGURE 3, was operated continuously for a 79-hour period. The operating temperature and pressure indicated in the table below are average values for the operating period and did not vary substantially. The material balance in the table below summarized the resulting operating data.

Operating conditions

Pressure _____ 13.3 p.s.i.a.
Feed point temperature _____ 190° F.
Overhead vapor temperature ____ 190° F.
Bottoms temperature _____ 215° F.
Iodine-entraining liquid _____ Xylene @ 3530 g./hr.

The total iodine content of the net overhead product by chemical analysis was 0.012 wt. percent for a typical analysis during the continuous operating period.

MATERIAL BALANCE.—HYDROGEN IODIDE CONCENTRATOR (GRAMS/HOUR)

|   | $I_2$ | HI | $H_2O$ | Total |
|---|---|---|---|---|
| In: Feed | 180 | 500 | 2,920 | 3,600 |
| Out: Net Overhead | 0.25 | 0 | 1,960 | 1,960 |
| Bottoms Product | 180 | 500 | 960 | 1,640 |
| Total |  |  |  | 3,600 |

In a typical batch process, a given quantity of dilute hydrogen iodide-iodine-water solution is placed in a suitable container, such as a still pot which can be heated, and to which is connected a distilling column. Initial heating causes iodine and water vapors to pass upwardly into the distilling column, e.g. at point 15 in FIGURE 1. As the system reaches temperature equilibrium the water phase can be removed. The water may be taken off continuously as it is condensed if desired, by holding the receiver interface constant and refluxing the iodine-entraining phase.

Referring to FIGURE 3 there is shown a somewhat more elaborate system than that of FIGURE 1, although the same general principles of operation apply. This arrangement is suitable for continuous operation. The dilute feed through line 113 enters the distillation tower or column 111. Overhead vapors pass to point 114 and then out through line 115 to the condenser 117 which may be equipped with a vent or back pressure control 118. The condensate flows through line 120 to the receiver-settler 119. The latter is equipped with a level controller device 122 which maintains the liquid interface 121 at the desired level. Water may be withdrawn through line 125 under control of the interface level device. Such means are well known in the art.

The solvent containing the extracted iodine is returned to a reflux splitter 124 through a line 123. This device splits the reflux into two streams, one of which is recycled at the top through line 123a and the remainder to the mid point of the tower, preferably about the same level as the feed inlet 113, as indicated at 123b.

The bottoms product, containing a higher concentration of hydrogen iodide than the feed, accumulates in the bottom of the tower as indicated at 129. Level controller 128 is provided to maintain this level constant. It can be varied as desired. Under control of the device 128, the concentrated tower stream may be withdrawn from the system through line 127.

A temperature controller, indicated at 135, is preferably included in the tower in its lower Zone A below the feed inlet. This controls, through valve 136, the flow of steam from a suitable supply source to the reboiler at the bottom of the distillation column, as indicated in line 137. A steam trap 138 is provided to release the steam condensate as desired.

Now, returning to the examples mentioned above, the iodine-entraining agent is added, for example by feeding it first through line 123b or into the receiver-settler 119, FIGURE 3. The receiver-settler, with its interface level control device, has only one inlet, preferably at its top, from the condenser. The receiver-separator has two outlets, one for returning the iodine-entraining liquid to the distillation system and the other for removing the water collected from the still.

As the system reaches temperature equilibrium, the water phase can be removed continuously as rapidly as it is condensed, by holding the interface level 121 constant and controlling valve 126 appropriately.

In operation, iodine, water vapors and some of the iodine-entraining agent, also as a vapor, pass upwardly through the distilling column whereas a liquid mixture of water which contains iodine and a small proportion of the organic iodine-liquid passes downwardly into the still pot or the heated zone below Zone A at the bottom of the tower. The vapors, which include iodine and solvent vapor, as well as water, pass upwardly into the condenser 117 where the iodine is forced back into the liquid phase as the vapors are cooled, being dissolved in the now liquid organic solvent. The water vapor is liquified in the condenser also and these liquid products pass to the receiver or decanter where substantially pure water separates at a bottom layer and is removed. The liquid solvent, containing dissolved iodine remains on top of the interface and is returned to the distillation column.

As the process continues, with passage of time a bottoms product accumulates in the still pot at the bottom of the tower. This bottoms product is a more concentrated aqueous solution of hydrogen iodide and iodine than the original feed. Such a bottoms product is often very useful as one of the feed stocks to serve in various chemical reactions such as the dehydrogenation reactions and others widely used in the chemical industry. The water taken off overhead is substantially free of iodine and generally may be discarded without serious pollution problems. It is normally most convenient to conduct the process under such conditions that the bottoms product eventually comprises about at 1 to 1 weight ratio mixture of hydrogen iodide and water, on an iodine-free basis. The bottoms of course contain substantial proportions of iodine.

The rate of reflux of the iodine-entraining phase, coupled with temperate control in the initial heated container, such as the still pot or reboiler (which may be a part of the distillation tower or separate therefrom) can give the desired net effect of substantially no inventory of the organic liquid-entraining agent in the bottoms product as the latter is withdrawn. Hence there is generally no need of substantial make-up for the organic solvent.

While the foregoing description of the process applies to both batch and continuous operation, continuous distillation usually is preferred. The system of FIGURE 3 is particularly suitable for this process. The feed is introduced near the middle of the column and the selected organic iodine-entraining agent or solvent is added to the system in suitable quantity to take up the iodine continuously. This may be introduced at any desired point, for example through line 123b. Valves not shown may be added for this purpose. The system is so devised that the iodine-entraining agent is present in liquid form on all distillation plates above the feed inlet point. This may be accomplished continuously by proper inventory control of the amount of solvent in the column, or by splitting the reflux stream of solvent and feeding part of it into the column at about the same elevation as the feed point, as previously described. The solvent can be injected directly into the tower, preferably above the top plate, by a separate entrance if desired.

For feed compositions which contain more water than that represented by the azeotropic composition of 43% water, FIGURE 2, this being on an iodine-free basis, the concentration of hydrogen iodide in the column above the feed point quickly drops essentially to zero. Hence the vapors in the upper part of the column, Zone B—FIGURE 3, consist essentially of water, iodine and the solvent. Thus the upper Zone B can be considered an enrichment zone to fractionate the HI-water azeotrope towards the bottom and the water-solvent azeotrope, including vaporized iodine, towards the top. Zone A below the feed point, may be considered as a stripping section to fractionate water upwards and to move towards the limiting concentration of the HI-water azeotrope which contains the net iodine feed as a bottoms product.

It will thus be understood that the iodine and hydrogen iodide are both recovered in the concentrated bottoms product. The overhead vapors consisting of iodine, water and solvent are merely led to the condenser, Zone C, whereby essentially all components reaching such zone are liquefied and permitted to fall into the decanter or settler 119, as previously explained.

It is not always essential that the solvent reflux be split, as indicated in FIGURE 3. In many cases it may simply be fed by direct reflux back at the top of the tower, as in FIGURE 1.

The bottom liquid phase in the receiver-settler consisting essentially of water with only trace quantities of solvent and iodine, depending on the solubility and distribution characteristics at the temperature used, may be continuously removed for disposal. If desired, on the other hand, it may be held further for recovery of the small quantities of solvent and iodine present therein.

The reflux splitter 124 FIGURE 3, may be used to split the entire organic phase if desired. The rate of boiling is controlled by the heat input to the system, i.e., by the temperature controller 135 previously described. A relatively sharp temperature gradient can be expected in the bottom zone of the column especially when it is desired to have minimum water content in the bottoms product. The net product is taken off through line 127 under control of the level controller 128.

The procedure of the present invention has many advantages over previous methods of concentrating dilute hydrogen iodide-iodine-water solution. It is simple and relatively free from external control. By calculation or by trial and error the controls may be set in such a way that the rate of iodine-entraining liquid leaving the upper Zone B of rectification is essentially and continuously equal to the rate of its return to such zone. When so adjusted, practically no iodine-entraining organic liquid, collects in or mingles with bottoms product. Under such conditions no addition of fresh entraining agent is required after the process has begun. Furthermore, easy control of the whole operation is accomplished. In one of the prior art processes described above, continuous or repeated addition of fresh hydrogen iodide solution is required which comingles with the bottoms product and is, in a sense, lost.

Suitable adjustments may be made in batch distillations through the interface level control means or, alternatively, by starting the distillation with some of the iodine-entraining liquid present in the heated zone, for example in the still pot at the bottom of the tower. Heating, of course, may be accomplished in a separate pot or boiler if desired.

The foregoing variations and modifications, and many others which will occur to those skilled in the art, are believed to be within the proper purview of the invention.

It is intended by the claims which follow to cover such, as far as the prior art properly permits.

What is claimed is:

1. A process for concentrating iodine and hydrogen iodide contained in a dilute aqueous solution, which comprises introducing said solution into a distillation zone, adding a normally liquid hydrocarbon forming an azeotrope with water and which is a solvent iodine to said zone, subjecting the mixture to distillation in said zone, whereby an overhead composed of water and said hydrocarbon containing entrained iodine is removed from the top of said zone, condensing said overhead, separating the resulting condensed water and iodine containing hydrocarbon and removing the water from the system and returning at least a portion of the recovered hydrocarbon with its iodine content to said zone.

2. The process of concentrating hydrogen iodide in aqueous solutions containing iodine, which comprises introducing said aqueous solution into a distillation system, subjecting to distillation said aqueous solution to which an organic liquid which is a selective solvent for iodine has been added, said solvent forming an azeotrope with water and being selected from the class consisting of hydrocarbons, halogenated hydrocarbons, carbon disulfide and nitrobenzene, taking off as an overhead stream a mixture of vapors of water and solvent containing entrained iodine, condensing said vapors, separating the resulting condensed water and iodine containing solvent, removing at least a portion of said condensed water from the system, returning at least a portion of said iodine containing solvent to the distillation step and recovering a concentrated aqueous solution of hydrogen iodide and iodine as bottoms from the distillation step.

3. Process according to claim 2 wherein the overhead mixture is a two-phase azeotrope of water and solvent.

4. Process according to claim 2 wherein the overhead mixture is an azeotrope of water and toluene boiling at about 85° C. at standard pressure.

5. The process of concentrating a dilute aqueous solution containing hydrogen iodide and iodine which comprises, in combination the steps of introducing into a distillation zone, as feed, said aqueous solution and a selective solvent for iodine which is immiscible with and forms azeotropes with water boiling between 42° to 100° C., said solvent being selected from the group consisting of hydrocarbons, halogenated hydrocarbons, carbon disulfide and nitrobenzene, distilling said aqueous and solvent mixture to pass some of both overhead in vapor form, substantially separating the aqueous and solvent components of said overhead and returning a relatively large portion of said solvent and relatively small portions of aqueous component from said overhead to said distillation zone, whereby the bottoms in said distillation zone become increased in concentration of hydrogen iodide and iodine.

6. Process according to claim 5 wherein the initial feed has a hydrogen iodide to water ratio by weight of less than about 1.3.

7. A process according to claim 5 wherein the selective solvent comprises an aromatic hydrocarbon.

8. Process according to claim 7 wherein the hydrocarbon has an alkyl substitution.

9. Process according to claim 7 wherein the hydrocarbon comprises benzene.

10. Process according to claim 7 wherein the hydrocarbon comprises a mixture of xylenes.

11. Process according to claim 5 wherein the solvent is cyclohexane.

12. Process according to claim 5 wherein the solvent comprises an organic compound forming with water a two-phase azeotrope having a boiling point between about 42° and 100° C. and having an iodine solubility at 25° C. of at least 0.019 part by weight.

13. A process for concentrating iodine and hydrogen iodide contained in a dilute aqueous solution, which comprises introducing said solution into a distillation zone, adding a normally liquid hydrocarbon halide forming an azeotrope with water and which is a solvent for iodine to said zone, subjecting the mixture to distillation in said zone, whereby an overhead composed of water and said hydrocarbon halide containing entrained iodine is removed from the top of said zone, condensing said overhead, separating the resulting condensed water and iodine containing hydrocarbon halide and removing the water from the system and returning at least a portion of the recovered hydrocarbon halide with its iodine content to said zone.

14. A process for concentrating iodine and hydrogen iodide contained in a dilute aqueous solution, which comprises introducing said solution into a distillation zone, adding xylene to said zone, subjecting the mixture to distillation in said zone, whereby an overhead composed of water and xylene containing entrained iodine is removed from the top of said zone, condensing said overhead, separating the resulting condensed water and iodine containing xylene and removing the water from the system and returning at least a portion of the recovered xylene with its iodine content to said zone.

15. A process for concentrating iodine and hydrogen iodide contained in a dilute aqueous solution, which comprises introducing said solution into a distillation zone, adding paraxylene to said zone, subjecting the mixture to distillation in said zone, whereby an overhead composed of water and paraxylene containing entrained iodine is removed from the top of said zone, condensing said overhead, separating the resulting condensed water and iodine containing paraxylene and removing the water from the system and returning at least a portion of the recovered paraxylene with its iodine content to said zone.

16. A process for concentrating iodine and hydrogen iodide contained in a dilute aqueous solution, which comprises introducing said solution into a distillation zone, adding toluene to said zone, subjecting the mixture to distillation in said zone, whereby an overhead composed of water and toluene containing entrained iodine is removed from the top of said zone, condensing said overhead, separating the resulting condensed water and iodine containing toluene and removing the water from the system and returning at least a portion of the recovered toluene with its iodine content to said zone.

References Cited

UNITED STATES PATENTS

| | | | |
|---|---|---|---|
| 2,324,240 | 7/1943 | Schaafsma | 203—69 |
| 2,833,700 | 5/1958 | Baumgartner et al. | 203—12 |
| 2,859,154 | 11/1958 | Othmer | 203—69 |
| 2,861,924 | 11/1958 | Raifsnider | 23—218 |
| 2,870,066 | 1/1959 | Bierotti | 23—218 |
| 3,096,274 | 7/1963 | Palmer | 208—356 |

WILBUR L. BASCOMB, JR., *Primary Examiner.*